United States Patent [19]

Okada et al.

[11] Patent Number: 5,206,921
[45] Date of Patent: Apr. 27, 1993

[54] METHOD AND APPARATUS FOR ATTACHING FERRULE TO OPTICAL CABLE

[75] Inventors: Kinjiro Okada; Hiromasa Shiraishi, both of Tokyo; Hirokazu Yokosawa, Nagano; Shinichi Takehana, Nagano; Norio Kobayashi, Nagano, all of Japan

[73] Assignee: Hirose Electric Co., Ltd., Tokyo, Japan

[21] Appl. No.: 886,361

[22] Filed: May 21, 1992

[30] Foreign Application Priority Data

May 22, 1991 [JP] Japan .................. 3-145244

[51] Int. Cl.⁵ .................................. G02B 6/36
[52] U.S. Cl. ................................ 385/134; 385/137
[58] Field of Search .............. 385/134, 137, 60, 72, 385/78, 85; 254/134.4; 362/32; 359/367; 248/362; 269/21

[56] References Cited

U.S. PATENT DOCUMENTS

| | | | |
|---|---|---|---|
| 4,678,271 | 7/1987 | Beaulieu | 385/134 |
| 5,062,384 | 11/1991 | Foley et al. | 269/21 X |

*Primary Examiner*—Akm E. Ullah
*Assistant Examiner*—Phan Thi Heartney
*Attorney, Agent, or Firm*—Kanesaka & Takeuchi

[57] ABSTRACT

An apparatus for attaching an optical cable to a ferrule (F) which has a front aperture (F1) for holding an optical cable and a rear aperture (F2) for retaining an optical fiber of the optical cable, which includes a support block (1); a vertical passage (2) extending downwardly from an upper face of the support block; a sealing member (3) disposed around the vertical passage for making an airtight seal when a rear section of the ferrule is set in the vertical passage; a lateral passage (4) extending laterally from a side of the support block and communicating with the vertical passage; and a suction unit (5) connected to the lateral passage to draw a quantity of adhesive from the front aperture to the rear aperture, forming a mass of adhesive.

2 Claims, 2 Drawing Sheets

METHOD AND APPARATUS FOR ATTACHING FERRULE TO OPTICAL CABLE

BACKGROUND OF THE INVENTION

1. Field of the Invention

The present invention relates to methods and apparatus for attaching ferrules to optical cables.

2. Description of the Prior Art

Ferrules are attached to optical cables for connecting two optical cables by means of a connector. Ferrules have a front aperture for holding the cable jacket of an optical cable and a rear aperture for retaining the optical fiber which is exposed from the cable jacket. Adhesives are put into ferrules to bond the optical cables to the ferrules. The optical fibers protruding from the rear apertures are cut and polished to form an abutment face which is to be abutted on that of another optical fiber by means of a connector.

However, optical fibers are so brittle that they can be broken upon cut and/or polished, forming rough abutment faces. Thus, masses of adhesive are manually put on the roots of projected fibers and, then, the adhesive masses and the optical fibers are cut and polished simultaneously.

However, since the adhesive attachment is the manual operation, it takes much time to put masses of adhesive to the rear faces of ferrules. In addition, it is frequent that the attached masses of adhesive are different in volume and shape from ferrule to ferrule. Further, the adhesives can adhere to the operators' hands and/or undesired areas of the ferrules.

SUMMARY OF THE INVENTION

Accordingly, it is an object of the invention to provide a method and apparatus for attaching a ferrule to an optical cable in which the operation of putting masses of adhesive on the rear surfaces of ferrules is automated.

It is another object of the invention to provide a method and apparatus for attaching a ferrule to an optical cable by which even masses of adhesive are formed on the rear surfaces of ferrule.

According to one aspect of the invention there is provided an apparatus for attaching an optical cable to a ferrule which has a front aperture for holding an optical cable and a rear aperture for retaining an optical fiber of the optical cable, which includes a support block; a vertical passage extending downwardly from an upper face of the support block; a sealing member disposed around the vertical passage for making an airtight seal when a rear section of the ferrule is set in the vertical passage; a lateral passage extending laterally from a side of the support block and communicating with the vertical passage; and a suction unit connected to the lateral passage to draw a quantity of adhesive from the front aperture to the rear aperture, forming a mass of adhesive.

According to another aspect of the invention, a ferrule is attached to an optical cable by the following steps:

In Step 1, a quantity of adhesive is put into the front aperture of a ferrule.

In Step 2, a drawing pressure is applied to the passage to draw the adhesive into the fine rear aperture, forming a mass of adhesive.

In Step 3, an optical fiber is inserted into the ferrule such that the cable jacket and the optical fiber are held by the front aperture and the rear aperture, respectively. As a result, an end portion of the optical fiber projects from the rear surface of the ferrule.

In Step 4, after the adhesive becomes hard, the projected optical fiber and the adhesive mass are ground off from the rear surface.

The above and other objects, features, and advantages of the invention will be more apparent from the following description when taken together in conjunction with the accompanying drawings.

DESCRIPTION OF THE PREFERRED EMBODIMENT

Figure 1:
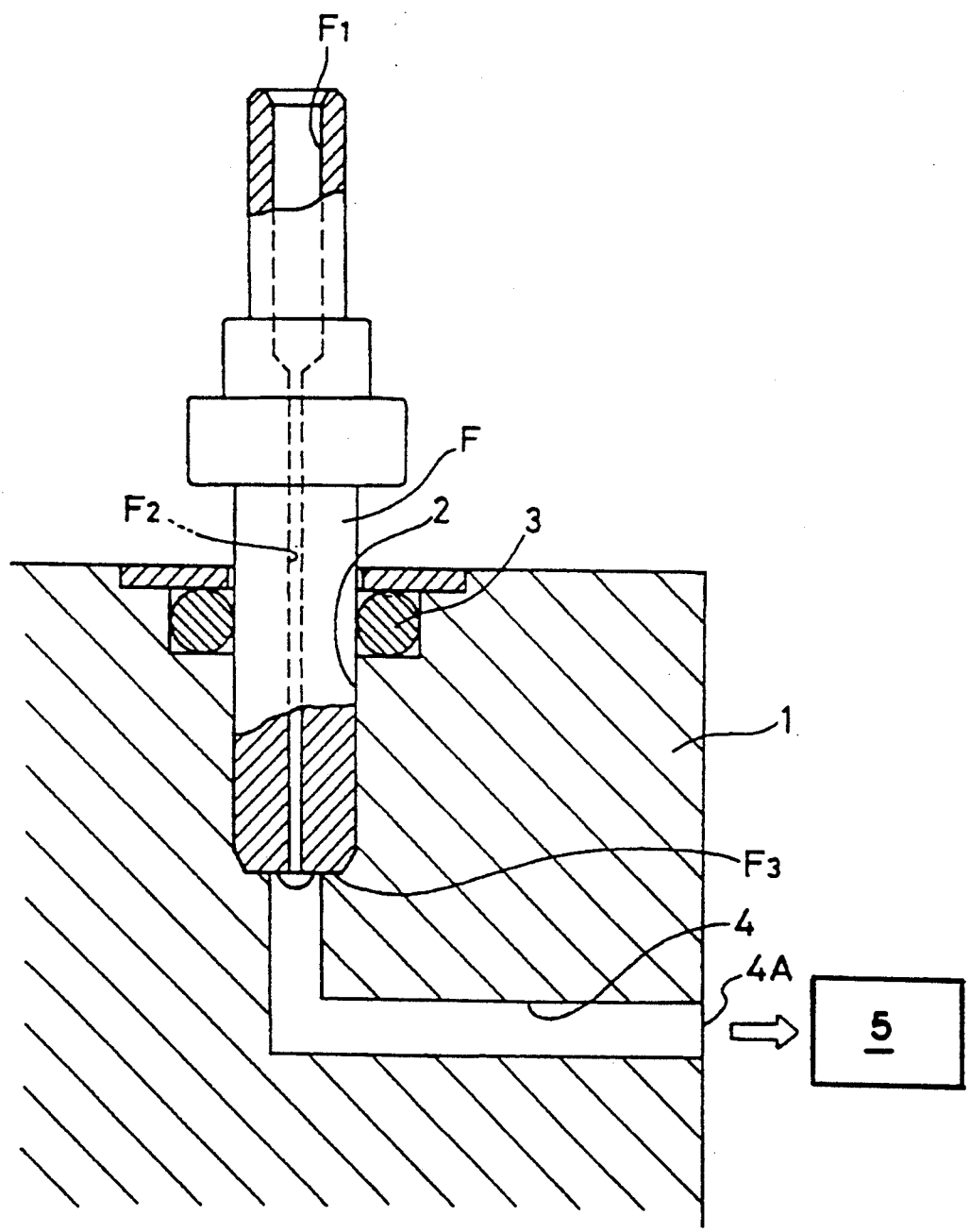
FIG. 1 is a sectional view of part of a ferrule attaching machine according to an embodiment of the invention.

In FIG. 1, the ferrule attaching machine includes a support block 1 having a vertical passage 2 for receiving a ferrule F. The vertical passage 2 has a diameter slightly larger than that of the retention section of the ferrule F. An O-ring 3 is put in the stepped section of the vertical passage 2. The inside diameter of the O-ring 3 is set so as to hold the ferrule F airtightly.

A lateral passage 4 extends laterally from a side of the support block 1 and communicates with the vertical passage 2. An inlet port 4A of the lateral passage 4 is connected to a suction unit 5.

A ferrule is attached to an optical cable as follows:

In Step 1, a ferrule F is placed into the vertical passage 2 and held by the O-ring 3 airtightly.

In Step 2, an adhesive is put into the front aperture F1 of the ferrule F.

In Step 3, the drawing pressure is applied to the inlet port 4A by the suction unit 5 to draw the adhesive from the front aperture F1 into the rear aperture F2, forming a mass of adhesive B on the rear surface F3.

Figure 2:
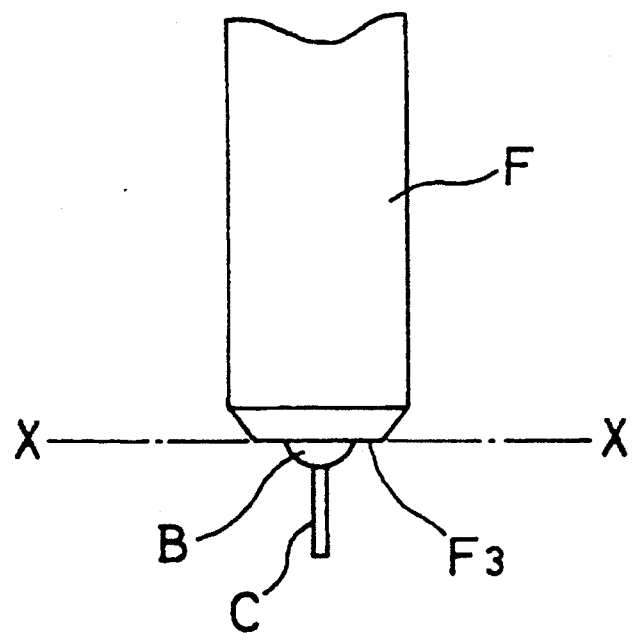
FIG. 2 shows a mass of adhesive formed by the ferrule attaching machine.

In Step 4, the ferrule is removed from the vertical passage 2, and an optical fiber is inserted into the ferrule by a suitable optical fiber inserting machine (not shown). As a result, as FIG. 2 shows, the optical fiber C projects from the rear surface F3 through the mass of adhesive B.

In Step 5, after the adhesive becomes hard, the optical fiber C and the adhesive mass B are ground off along line X—X, forming an abutment face for abutment with another optical fiber.

With the above method it is very easy to form even masses of adhesive on the rear surfaces of ferrules.

We claim:

1. Apparatus for attaching an optical cable to a ferrule which has a front aperture for holding an optical cable and a rear aperture for retaining an optical fiber of said optical cable, comprising:
   a support block;
   a vertical passage extending downwardly from an upper face of said support block;
   sealing means disposed around said vertical passage for making an airtight seal when a rear section of said ferrule is set in said vertical passage;
   a lateral passage extending laterally from a side of said support block and communicating with said vertical passage; and a suction unit connected to said lateral passage to draw a quantity of adhesive from said front aperture to said rear aperture, forming a mass of adhesive.

2. A method of attaching an optical fiber to a ferrule which has a front aperture for holding an optical cable and a rear aperture for retaining an optical fiber of said optical cable, comprising the steps of:

putting a quantity of adhesive into said front aperture;

applying a drawing pressure to said rear aperture to draw said adhesive from said rear aperture, forming a mass of adhesive;

inserting an optical fiber into said ferrule;

letting said adhesive to become hard; and grinding an optical fiber projected from said rear aperture together with said mass of adhesive, forming an abutment face.

* * * * *